United States Patent [19]

Li et al.

[11] Patent Number: 5,501,922

[45] Date of Patent: Mar. 26, 1996

[54] POLYOXOMETALATE CARBON ELECTRODES AND ENERGY STORAGE DEVICE MADE THEREOF

[75] Inventors: Changming Li; Lijun Bai, both of Vernon Hills; Keryn Ke Lian, Northbrook, all of Ill.

[73] Assignee: Motorola, Inc., Schaumburg, Ill.

[21] Appl. No.: 418,354

[22] Filed: Apr. 7, 1995

[51] Int. Cl.[6] .............................. H01M 4/58; H01G 9/00; C25B 11/12

[52] U.S. Cl. .......................... 429/218; 361/502; 361/503; 361/508; 361/523; 361/525; 361/526; 361/528; 361/532; 361/541; 204/294; 429/209; 429/212

[58] Field of Search ...................................... 429/209, 218, 429/212; 361/502, 503, 504, 505, 508, 516, 523, 525, 526, 541, 528, 532; 204/434, 294

[56] References Cited

U.S. PATENT DOCUMENTS 4,630,176  12/1986  Cuellar et al. ........................... 361/433
4,633,372  12/1986  Calahan et al. ......................... 361/433

Primary Examiner—John Niebling
Assistant Examiner—Bruce F. Bell
Attorney, Agent, or Firm—Dale W. Dorinski; Kenneth M. Massaroni

[57] ABSTRACT

An electrode for an energy storage device is made from an activated carbon support. The activated carbon has adsorbed onto it a protonated polymer, which has a polyoxometalate absorbed into the polymer. Preferably, the protonated polymer is poly(4-vinylpyridine), and the polyoxometalate is isopolymolybdate. An energy storage device, such as a capacitor, can be made from the modified carbon electrode. A pair of the coated carbon electrodes (13) are placed in contact with an electrolyte to form the device.

17 Claims, 3 Drawing Sheets

POLYOXOMETALATE CARBON ELECTRODES AND ENERGY STORAGE DEVICE MADE THEREOF

CROSS REFERENCE TO RELATED APPLICATIONS

This application is related to Docket No. EN10185 by Lian, et al, entitled "Improved Carbon Electrodes and Energy Storage Device Made Thereof," filed concurrently herewith, and assigned to Motorola, Inc.

TECHNICAL FIELD

This invention relates in general to electrical energy storage devices and more particularly to double layer capacitors and electrodes for use with double layer capacitors.

BACKGROUND

Energy generation and storage has long been a subject of study and development. Of special import is the storage of energy in a compact form that can be easily charged and discharged, such as rechargeable batteries and/or capacitors. The components of these various systems have been generally optimized by seeking to achieve the maximum stored energy density. However, most, if not all, commercially-available systems yield far less than their theoretical energy density. One such energy storage system utilizes activated carbon electrodes to store ions therein, and which, upon discharge, releases the ions to generate an electrical current. One example of an activated carbon electrode system is a double layer capacitor system described in U.S. Pat. No. 3,536,963. The mechanism for energy storage is based on the formation of an electrical double layer at the interface between an activated carbon electrode and a supporting electrolyte under an applied electrical field. Double layer capacitors will accept and store significant amounts of energy at a wide variety of potentials, unlike batteries where a given threshold voltage must be exceeded. Optimization of this type of system is based upon enhancing the charge storage capacity of the activated carbon electrode. Double layer capacitors can exhibit a capacity equivalent to tens of farads per gram of activated carbon when the activated carbon has a surface area in excess of 1000 square meters per gram ($m^2/g$). However, even this improvement has limited application because the energy density needs to be even greater. One way of improving the charge storage capacity is to coat the surface of the activated carbon with a material. U.S. Pat. No. 4,633,372, incorporated herein by reference, modifies the activated carbon with a polyoxometalate in order to provide a reversible electron transfer between the electrolyte and the electrode. These iso- and hetro-polyions, the example, the polyoxometalates, are known to exhibit reversible multi-electron transferring reaction, and are used to modify the carbon electrodes to increase the charge storage capacity. However, this modification does not increase the capacity significantly, since the absorption of the polyoxometalates only forms a monolayer on the surface of the carbon, and the polyoxometalate can be easily leached away during long term cycling of the electrode. In addition, the prior art methods require very long processing times (2–3 weeks) to get the polyoxometalate properly coated onto the surface of the carbon.

Clearly, it would be desirable to form an electrode that exhibits increased charge storage capacity, thus further enabling miniaturization of energy storage devices.

SUMMARY OF THE INVENTION

Briefly, according to the invention, an electrode for an energy storage device is made from an activated carbon support. The activated carbon has adsorbed onto it a protonated polymer, which has a polyoxometalate absorbed into the polymer. In an alternate embodiment, an energy storage device is made from the coated carbon electrode. A pair of the coated carbon electrodes are placed in contact with an electrolyte to form the device.

DETAILED DESCRIPTION OF THE PREFERRED EMBODIMENT

Figure 1:
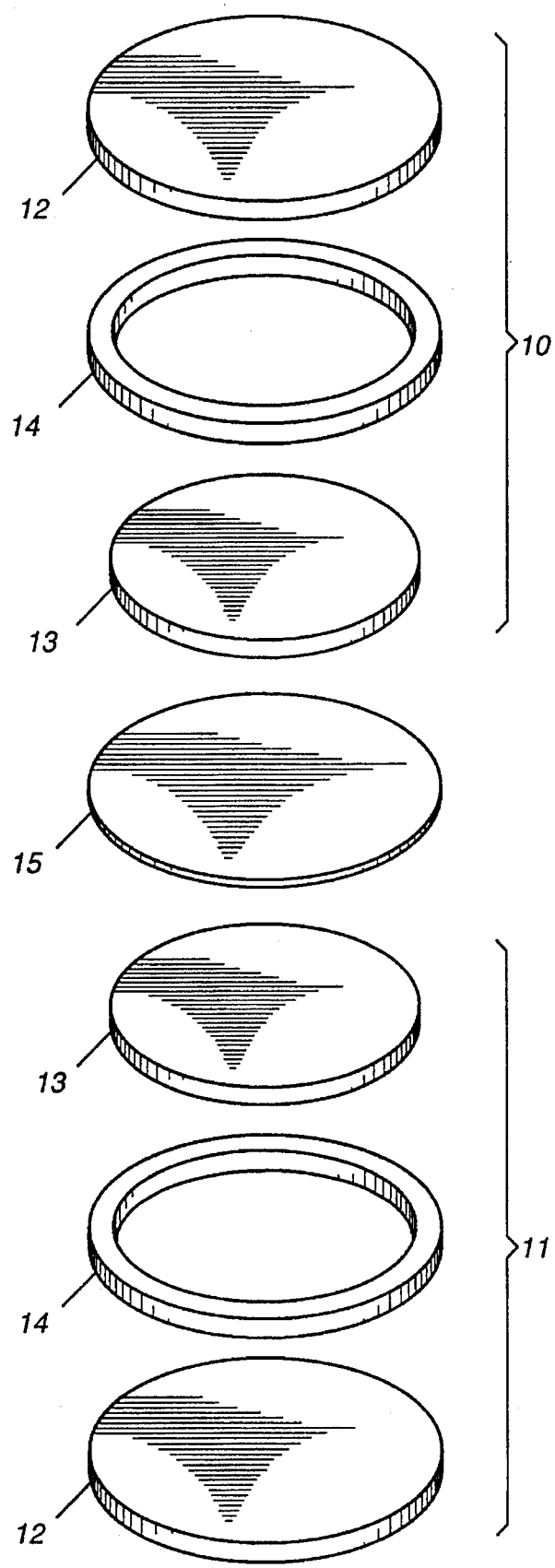
FIG. 1 is an exploded view of the components of an energy storage device in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an energy storage device, such as a double layer capacitor, is made from a pair of identical electrode assemblies 10 and 11. Each electrode assembly includes a current collector 12 which is electrically conducting and ionically insulating. Current collector 12 may be made of any conventional material such as nickel, titanium, stainless steel, or iron, and may be in sheet form, a mesh or a screen. The current collector 12 is preferably chemically inert to the particular electrolyte employed. A housing or gasket 14 is connected to the current collector 12 and the carbon electrode 13 is contained within the housing. A separator 15 is affixed between the two electrodes 10 and 11 and functions as an electrical insulator between the electrodes, and it affords free and unobstructed movement to the ions in the electrolyte. Of course, the separator 15 must also prevent contact between the opposing carbon electrodes 13, since such a condition would result in a short circuit and malfunction of the capacitor. Materials useful for the separator 15 are well known to those skilled in the art, including porous polyvinylchloride, filter paper, polypropylene, cellulose acetate, felt, and other types of similar materials. Separator 15 is typically saturated with the electrolyte when aqueous or other liquid electrolytes are used. Electrolytes used with this invention should consist of highly-conductive media, such as aqueous solutions of an acid, salt, or a base. Examples of some suitable aqueous electrolytes are ammonium chloride, sodium chloride, calcium chloride, potassium chloride, sulfuric acid, sodium hydroxide, potassium hydroxide, hydrochloric acid, etc.

The carbon electrode 13 consists of activated carbon having a protonically conducting polymer absorbed into the carbon. The activated carbon or graphite is available in many forms, for example, particles, fibers, powder, sheet, cloth, felt, etc. and all may find use in forming an electrode. In the preferred embodiment, activated carbon powder was coated with a conductive polymer to form the electrode. Examples of some suitable conducting polymers include, but are not limited to, the families of polyether, polyamide, poly(acrylic acid), and polyamine. More specifically, poly(ethylene oxide), polyvinylalcohol, poly(acrylamide), poly(vinylpyrrolidone), poly(2-vinylpyridine), poly(4-vinylpyridine), and poly(ethyleneimine) may be employed as conducting polymers. In the preferred embodiment, protonated poly(4-vinylpyridine) (HPVP$^+$) is used as the conducting polymer. The protonically conducting polymer has a polyoxometalate absorbed within the matrix of the polymer. More specifically the polyoxometalate may be an isopolyoxometalate, and in the preferred embodiment, isopolymolybdate is used. A number of other polyoxometalates may also be used in the invention. For example, polyoxometalates represented by the formula $A_x[M_yO_z]$ where A is at least one ion selected from the group consisting of hydrogen, the Group IA and IIA elements, and ammonium; M is a metal selected from the group consisting of Mo, Nb, Ta, V, and W; x is a number which when multiplied by the valence number of A will balance the charge on the $M_yO_z$ complex; y is a number ranging from 1 to about 20; and z is a number ranging from about 1 to about 150. The polyoxometalate may further comprise another element in the molybdenum oxide complex, as represented by the formula $A_x[L_qM_yO_z]$, where the additional element L may be one or more materials selected from the group consisting of Al, Co, Cr, Cu, Fe, I, Ge, Mn, Ni, P, Rh, Se, Si, Sn, Te.; and q is a number ranging from about 1 to about 20.

Thus, the particles of activated carbon have the conductive polymer adsorbed on the surface of the carbon, with the polyoxometalate compound imbedded or impregnated into the polymer matrix. The pH of the electrolyte should be chosen so that the polyoxometalate is stable as used, and may vary depending upon the particular polyoxometalate selected. Since polymer films generally contain the equivalent of many monomolecular layers worth of electroactive sites, the electrochemical response of the impregnated polymer film can be much larger than that of immobilized monomolecular layers such as described in U.S. Pat. No. 4,633,372, incorporated herein by reference. The instant invention increases the charge storage capacity of the activated carbon by implanting iso-and hetro-polyanions into the conductive polymer-coated activated carbon surface. Since poly(4-vinylpyridine) (PVP) has pyridine ligands to co-ordinate the redox species, the protonated poly(4-vinylpyridine) (HPVP$^+$) with positive charge can make the trapping stronger for the anions via electrostatic interaction, then isopolymolybdate, an anion, should be very easily immobilized in the polymer film.

The following examples will serve to illustrate the increased charge storage capacity of the activated carbon electrode that has been achieved by the instant invention.

Preparation of solutions

EXAMPLE 1

An HPVP$^+$ solution was prepared by placing a measured quantity of PVP with a molecular weight of about 50,000 (obtained from Aldrich Chemical Company) into a beaker containing a magnetic stirring bar. Half of the water required to make a 2% solution by weight of PVP was added to the beaker, and concentrated hydrochloric acid (HCl) was added dropwise to completely protonate the PVP, forming HPVP$^+$. (One could also use concentrated $H_3PO_4$ or $H_2SO_4$). The rate at which the HCl was added was such that equilibrium was achieved between each successive addition of acid. After complete dissolution of the polymer, the final pH of the solution was adjusted to about 3, then additional make-up water was added in order to bring the final concentration of HPVP$^+$ to about 2% by weight.

The polyoxometalate was isopolymolybdate, prepared by making a 1 molar solution of sodium oxymolybdate-dihydrate ($Na_2MoO_4 \cdot 2H_2O$) (obtained from Aldrich Chemical Company). Nine molar sulfuric acid was added dropwise to the one molar solution of sodium oxymolybdate-dihydrate in order to bring the solution to a pH of 2.9–3.1. At this point, the sodium oxymolybdate self-polymerized to form the isopolymolybdate. A fresh isopolymolybdate was prepared for each example.

Preparation of electrodes

Activated carbon powder microelectrodes were made from activated carbon having a surface area of approximately 2000 square meters per gram ($m^2/g$). The carbon powder used was grade M-20 obtained from Spectro Corp.

EXAMPLE 2

A control microelectrode was made from the M-20 activated carbon powder.

EXAMPLE 3

Another microelectrode was created by immersing an electrode similar to that of Example 2 in the isopolymolybdate solution for thirty minutes. The electrode was then dried in an oven at 70° C. for 20–30 minutes.

EXAMPLE 4

Still another microelectrode was made first immersing an electrode similar to that of Example 2 in the HPVP$^+$ solution for 30 minutes and drying in an oven at 70° C. for 30 minutes. This polymer coated electrode was further modified by placing it in the isopolymolybdate solution for thirty minutes and then drying at 70° C. for 20–30 minutes.

Figure 2:
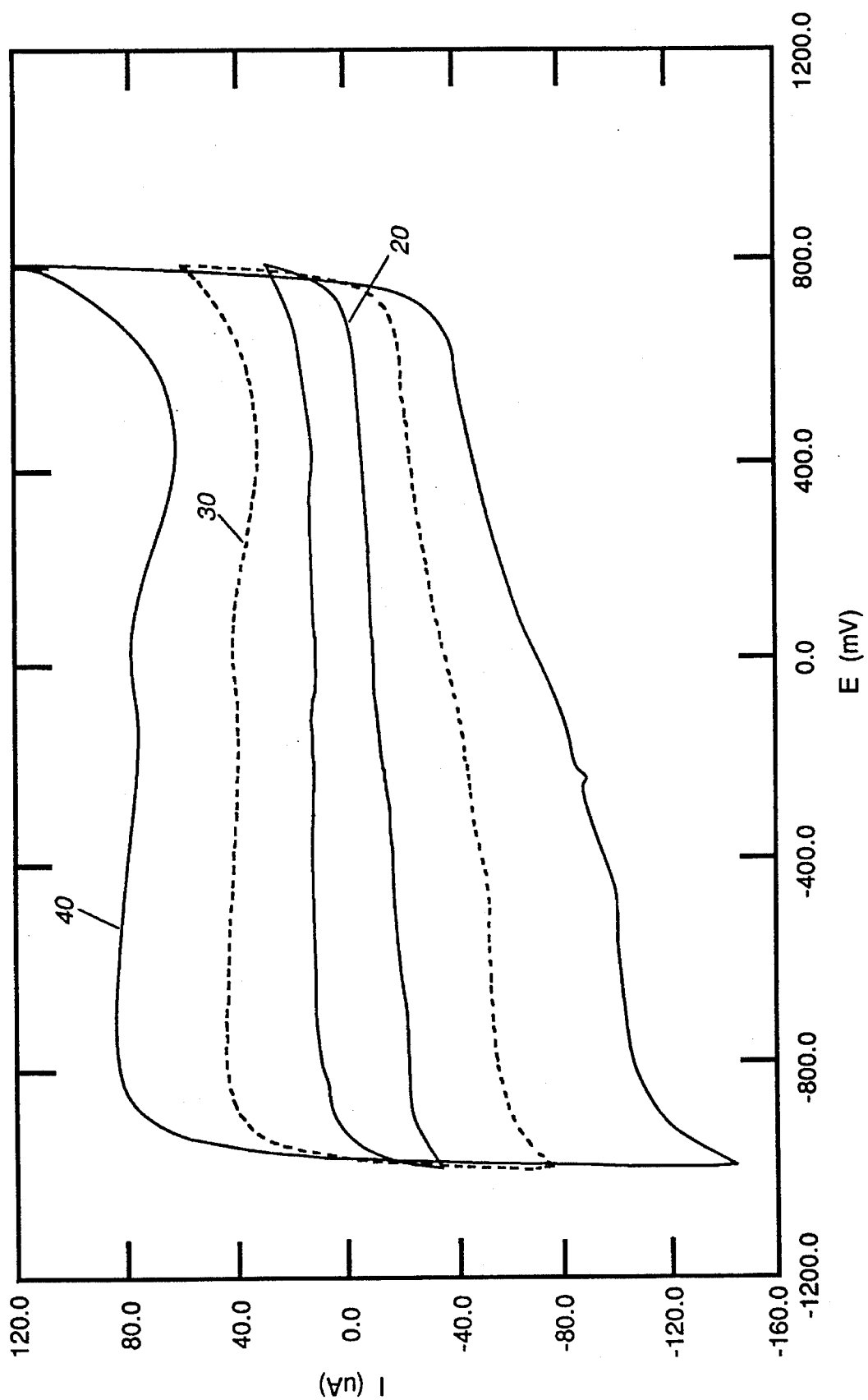
FIG. 2 is a cyclic voltammogram of an electrode made in accordance with the invention.

Energy storage devices were fabricated using the carbon microelectrodes prepared in Examples 2–4, and evaluated under varying conditions. Each of the prepared devices were measured in a potentiostat by charging and discharging over a limited voltage range and measuring the delivered current in microamps. This curve is known as a cyclic voltammogram (CV) curve. FIG. 2 shows the CV curves obtained from devices made using an electrolyte of 3 molar sodium chloride adjusted to a pH of 3. As may be seen, the capacitor of Example 2 using the pure activated carbon (20) showed a very limited charge storage capacity over the voltage range of interest. The isopolymolybdate modified carbon electrode of Example 3 (30) showed an improvement over pure activated carbon of approximately one hundred percent. However, the capacitor of Example 4 having the conductive polymer impregnated onto the surface (40) showed a significant improvement over both the uncoated carbon and the isopolymolybdate modified carbon. The reference electrode for the CV cycling test was a silver chloride electrode, and the counter electrode was a platinum wire. The results demonstrate that the charge storage capacity of the isopolymolybdate modified electrode is more than 1.8 times greater than that of pure activated carbon and that the HPVP$^+$/isopolymolybdate modified electrode was more than five times that of pure activated carbon.

Figure 3:
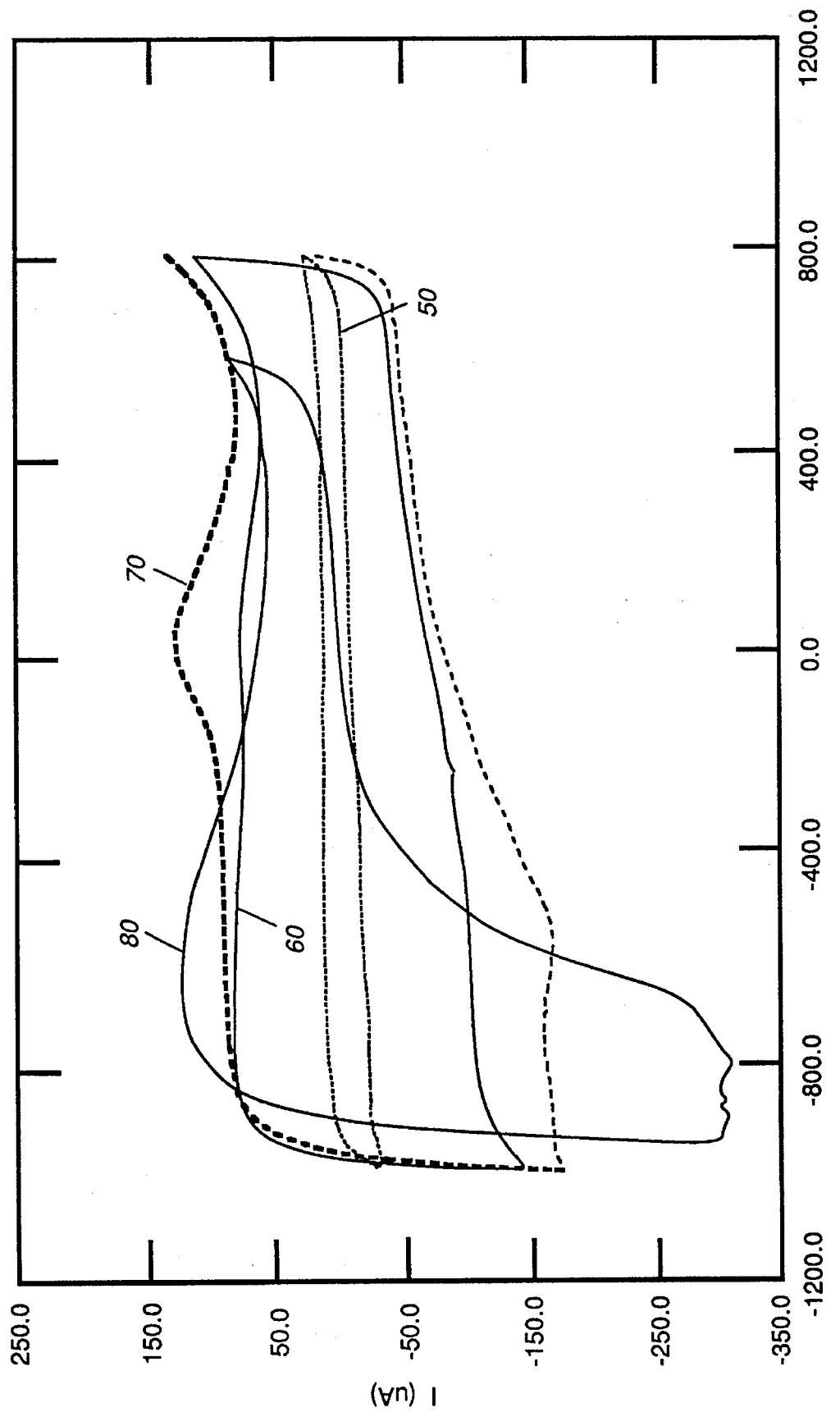
FIG. 3 is a cyclic voltammogram of electrodes made in accordance with the invention, in different electrolytes.

FIG. 3 shows the CV curves obtained using the isopolymolybdate HPVP$^+$ impregnated activated carbon powder (electrode of Example 4) in different electrolytes. The construction of each of these capacitors was essentially equivalent to that in the previous tests, however the electrolyte was varied in each case. CV curve 50 shows the pure activated carbon with an electrolyte of 3 molar sodium chloride at a pH of 3. CV curve 60 shows the HPVP$^+$/isopolymolybdate modified material using 3 molar sodium chloride electrolyte at a pH of 3. Curve 70 shows the same material with the electrolyte altered to a neutral pH of 7, and curve 80 shows the same material using an electrolyte comprising a 30% KOH solution. This indicates that the isopolymolybdate/HPVP$^+$ modified activated carbon functions quite well in acidic, basic and neutral electrolytes, and shows improvements over the prior art structures in each of these environments.

In summary, activated carbon modified with protonated poly(4-vinylpyridine) (HPVP$^+$) and isopolymolybdate was found to provide improved electrodes over the prior art. Capacitors made from these electrodes exhibited superior performance compared to prior art capacitors. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for an energy storage device, comprising a carbon support having adsorbed thereon a protonated polymer, the polymer having absorbed therein a polyoxometalate.

2. The electrode as described in claim 1, wherein the polyoxometalate is represented by the formula:

$$A_x[M_yO_z]$$

wherein

A is at least one ion selected from the group consisting of hydrogen, the Group IA and IIA elements, and ammonium;

M is a metal selected from the group consisting of Mo, Nb, Ta, V, and W;

x is a number which when multiplied by the valence number of A will balance the charge on the $M_yO_z$ complex;

y is a number ranging from 1 to about 20; and z is a number ranging from about 1 to about 150.

3. The electrode as described in claim 2, wherein the polyoxometalate further comprises:

$$A_x[L_qM_yO_z]$$

wherein

L is at least one element selected from the group consisting of Al, Co, Cr, Cu, Fe, I, Ge, Mn, Ni, P, Rh, Se, Si, Sn, Te.; and q is a number ranging from about 1 to about 20.

4. The electrode as described in claim 1, wherein the polyoxometalate is an isopolyoxometalate.

5. The electrode as described in claim 4, wherein the polyoxometalate comprises isopolymolybdate.

6. The electrode as described in claim 1, wherein the protonated polymer is one or more materials selected from the group consisting of polyether, polyamide, poly(acrylic acid), and polyamine.

7. The electrode as described in claim 1, wherein the protonated polymer is one or more materials selected from the group consisting of poly(ethylene oxide), polyvinylalcohol, poly(acrylamide), poly(vinylpyrrolidone), poly(2-vinylpyridine), poly(4-vinylpyridine), and poly(ethyleneimine).

8. The electrode as described in claim 1, wherein the carbon support comprises activated carbon in the form of particles, graphite, fibers, powder, sheet, cloth or felt.

9. An energy storage device comprising a pair of electrodes, an electrolyte in contact with said pair of electrodes, and at least one electrode comprising an activated carbon support having absorbed thereon a protonated polymer film implanted with a polyoxometalate.

10. The energy storage device as described in claim 9, wherein the polyoxometalate is represented by the formula:

$$A_x[M_yO_z]$$

wherein

A is at least one ion selected from the group consisting of hydrogen, the Group IA and IIA elements, and ammonium;

M is a metal selected from the group consisting of Mo, W, and V;

x is a number which when multiplied by the valence number of A will balance the charge on the $M_yO_z$ complex;

y is a number ranging from 1 to about 20; and z is a number ranging from about 1 to about 150.

11. The energy storage device as described in claim 10, wherein the polyoxometalate further comprises:

$$A_x[L_qM_yO_z]$$

wherein

L is at least one element selected from the group consisting of P and Si; and q is a number ranging from about 1 to about 20.

12. The energy storage device as described in claim 9, wherein the polyoxometalate is an isopolyoxometalate.

13. The energy storage device as described in claim 12, wherein the polyoxometalate comprises isopolymolybdate.

14. The energy storage device as described in claim 9, wherein the protonated polymer is one or more materials selected from the group consisting of polyether, polyamide, poly(acrylic acid), and polyamine.

15. The energy storage device as described in claim 9, wherein the protonated polymer is one or more materials selected from the group consisting of poly(ethylene oxide), polyvinylalcohol, poly(acrylamide), poly(vinylpyrrolidone), poly(2-vinylpyridine), poly(4-vinylpyridine), and poly(ethyleneimine).

16. The energy storage device as described in claim 9, wherein the protonated polymer film comprises protonated poly(4-vinylpyridine).

17. An energy storage device comprising an electrolyte in contact with a pair of electrodes, at least one of said pair of electrodes comprising an activated carbon support having absorbed therein protonated poly(4-vinylpyridine) implanted with isopolymolybdate.

\* \* \* \* \*